United States Patent [19]

Hoover

[11] 4,323,429
[45] Apr. 6, 1982

[54] SPENT SOLVENT PURIFICATION APPARATUS

[76] Inventor: Jack W. Hoover, 575 Valbon St., Orange Park, Fla. 32073

[21] Appl. No.: 157,443

[22] Filed: Jun. 9, 1980

[51] Int. Cl.³ .............................. B01D 3/00; B08B 7/04
[52] U.S. Cl. ................................. 202/83; 202/185 D; 202/185 E; 202/206; 202/234
[58] Field of Search .................... 202/163, 182, 185 R, 202/185 D, 185 E, 206, 234, 235, 233, 83

[56] References Cited

U.S. PATENT DOCUMENTS

| 1,086,684 | 2/1914 | Molesworth | 202/185 D |
| 1,199,147 | 9/1916 | Baldwin | 202/185 D |
| 3,483,092 | 12/1969 | Young | 202/206 |
| 4,204,913 | 5/1980 | Sabatka | 202/206 |

*Primary Examiner*—Frank Sever
*Attorney, Agent, or Firm*—Roger L. Martin

[57] ABSTRACT

A spent solvent purification apparatus for treating spent acetone includes an evaporation unit, a condensing unit, and a housing for the units which has upper and lower sections and a panel section that divides the housing interior into separate compartments for the respective units. The evaporating unit is housed by the upper section and it includes a container with an interior wall that divides the interior into upper and lower chambers. The lower chamber has a heater for heating a heat exchange fluid that is contained therein and the upper chamber is for containing the spent solvent during the batch distillation procedure to which it is subjected. Both chambers have temperature sensors which are designed to break the control circuit when the temperature in either chamber exceeds a temperature that is predetermined and set for each sensor. The condensing unit is in the lower compartment of the housing and it is suspended from a preformed portion of the panel section which is designed to support the heat exchanger in a manner such that the condensate formed therein flows to the condensate discharge outlet of the heat exchanger by gravity. The bottom section of the housing provides a reservoir for cooling water which, by means of a pump, is circulated between the reservoir and heat exchanger located in the lower compartment.

7 Claims, 8 Drawing Figures

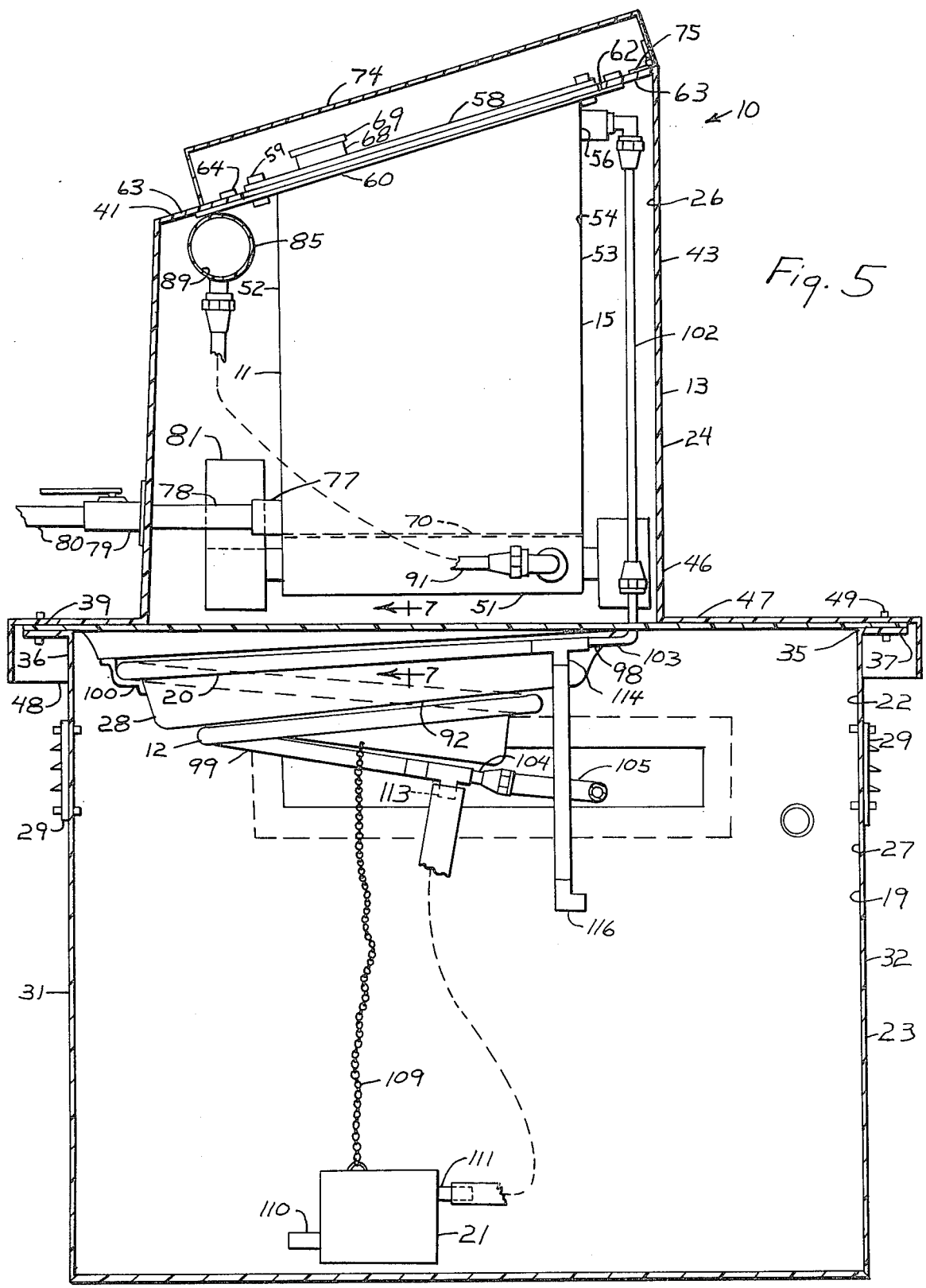

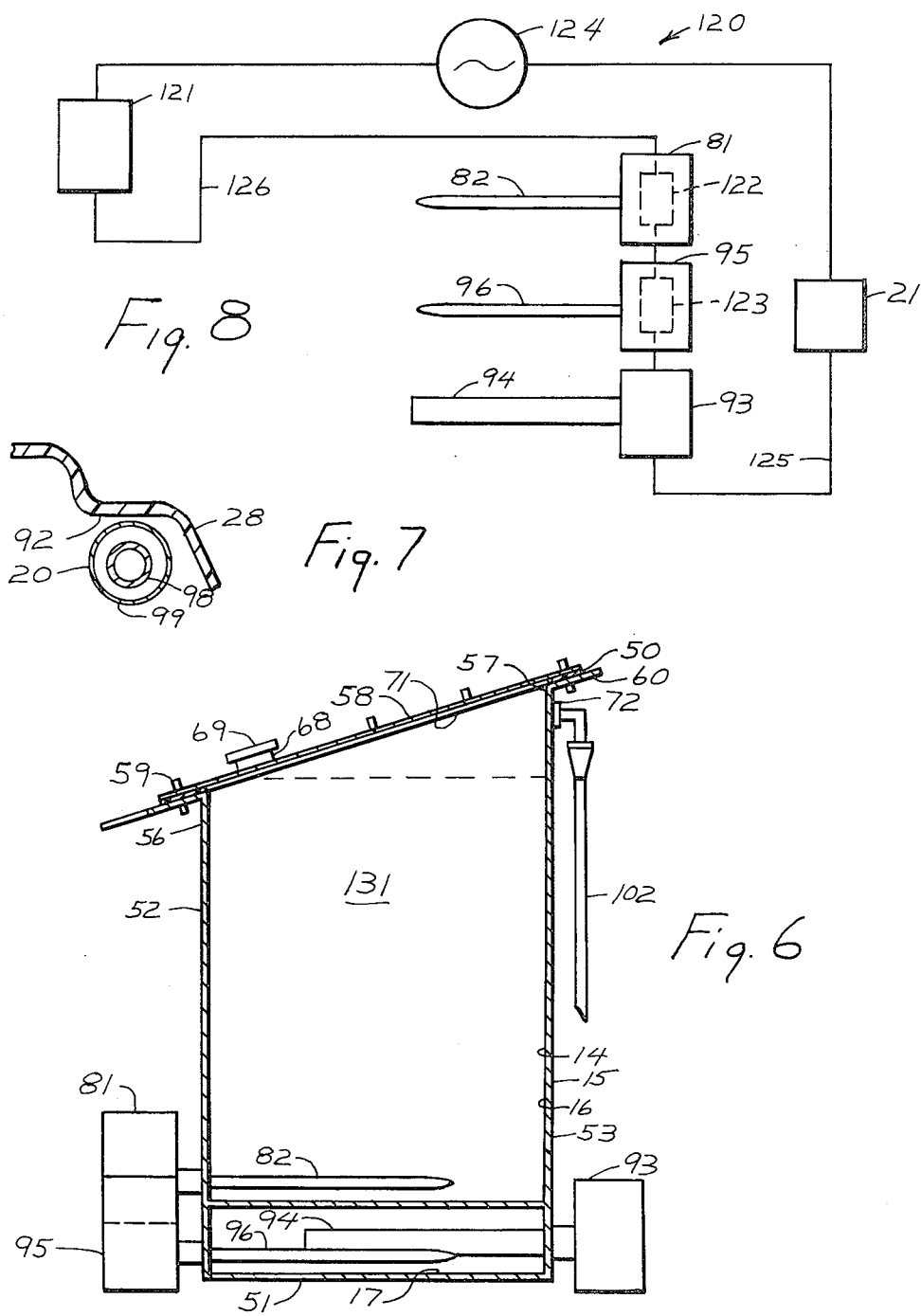

SPENT SOLVENT PURIFICATION APPARATUS

BACKGROUND OF THE INVENTION

The invention relates to a solvent recovery apparatus and more particularly to a distillation device for recovering acetone by batch distillation procedures from spent acetone.

The purification of volatile solvent materials by distillation procedures is known. However, the equipment used is normally adapted for continuous operations that contemplate a high volume throughput and require skilled personnel to operate. Such equipment is expensive to manufacture and operate, and it is not normally adaptable to low volume operations.

Acetone is used as a common solvent in the fiberglass product industry for cleaning tools and other equipment. It functions as a solvent for most of the resins and resinous products that are used in the industry and when the solvent becomes spent and thus loaded with the resinous materials, the spent solvent has in the past been commonly disposed of as a waste product. With the rapid growth in initial costs for the solvent materials and the increasing concern for the protection of the environment and the resulting higher costs for the disposal of such products, the need has developed for a low cost apparatus which can be effectively and safely used by unskilled working personnel to recover such highly volatile and flammable solvents as fresh acetone.

A general object of the invention is to provide improved solvent recovery apparatuses. Yet another object is to provide a solvent recovery apparatus which is particularly suited for fulfilling the needs of small manufacturers that use such small quantities of solvent as to preclude the economical use of continuously operating solvent recovery systems. Still another objective is to provide a solvent recovery apparatus that avoids the use of pressurized equipment and may be safely operated by unskilled workers with a minimum of attention. Yet another object is to provide a solvent recovery apparatus that utilizes batched distillation procedures and is portable so as to be readily located at a plant facility in accord with governmental regulations pertaining to the handling of toxic and highly combustible materials. Still a further object is to provide a low cost spent solvent purification apparatus that is adapted for installation and use exteriorly of plant housing facilities.

SUMMARY OF THE INVENTION

The invention contemplates a portable batch-type solvent distillation apparatus which has evaporation and condensing units that are contained in a ground supported housing which enables its installation and use as an outdoor facility.

The housing has molded sections which are made from fiberglass reinforced resinous materials and it includes a compartment forming section that houses the condensing unit and which is provided with a reservoir for storing a supply of cooling water that is used in the unit during the operation of the apparatus. The condensing unit is designed to operate at substantially atmospheric pressure conditions and has a heat exchanger which is appropriately inclined between its vapor inlet and condensate discharge ends so as to provide for the gravitational flow of the condensate in the exchanger. As will be subsequently seen, the heat exchanger is suspended at the underside of a preformed panel section of the housing and which, among other things, serves to divide the interior of the housing into upper and lower compartments.

An upper section of the housing provides the upper compartment in which the evaporation unit is housed and this unit comprises an aluminum tank that is fabricated to provide a pair of chambers in its interior. One chamber serves to contain the spent solvent to be purified while the other chamber contains a high boiling temperature heat transfer medium which is heated by an electrical element contained in the heating chamber. This arrangement avoids sparks, high temperature surfaces and open flames which could initiate explosions with highly volatile materials such as acetone. Suitable controls are also provided for controlling the operation of the heating element in response to the temperature condition attained within the respective chambers in accord with certain aspects of the invention and yet other aspects will be apparent from the balance of the description found in the Specification.

BRIEF DESCRIPTION OF THE DRAWINGS

The novel features which are believed to be characteristic of this invention are set forth with particularity in the appended claims. The invention, itself, however, both as to its organization and method of operation, together with further objects and advantages thereof, may best be understood by reference to the following descriptions taken in connection with the accompanying drawings, wherein:

FIG. 5 is a vertical sectional view through the apparatus as taken generally along the Lines 5—5 in FIG. 1;

FIG. 6 is a sectional view through a tank component of the apparatus as taken generally along the Lines 6—6 in FIG. 1;

FIG. 7 is a sectional view showing a fragment of the apparatus as taken generally along the Lines 7—7 of FIG. 5; and FIG. 8 is a schematic diagram of the electrical control system of the apparatus.

EMBODIMENT DESCRIPTION

Figure 1:
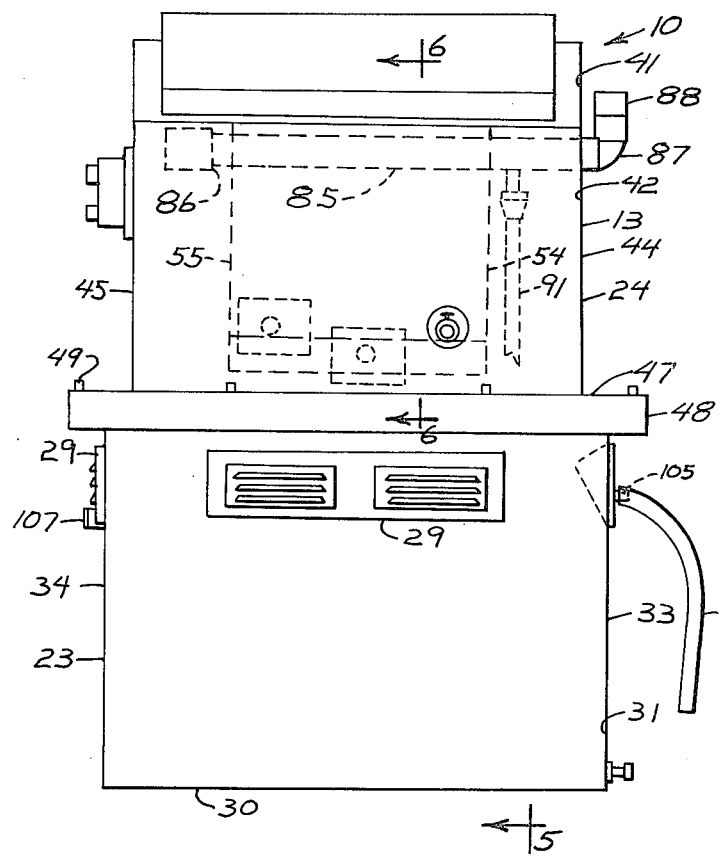
FIG. 1 is a front elevational view of a distillation apparatus embodying the principles of the invention with certain hidden parts being shown in broken lines.

Reference is now made to the drawings and wherein the spent solvent purification apparatus is illustrated in the form of a distillation device or apparatus 10 for treating spent acetone by batch-type distillation procedures. The device 10 is used for recovering the acetone component of the spent solvent and includes an evaporator or boiler unit 11, a condensing unit 12 and a housing 13 for housing and protecting the units 11 and 12 from the outdoor elements.

The evaporation unit 11 is provided to treat the batch of spent acetone at sustantially atmospheric pressure conditions and serves to vaporize the solvent component of the spent liquid acetone and as flammable vapors from the residual material remaining from the vaporization treatment. It includes a fabricated receptacle or tank that is made from aluminum structural components. The tank 15 has a horizontal internal wall that divides the interior 14 of the tank into a pair of chambers 16 and 17. Chamber 16 is adapted to receive the batch of spent acetone and serves to contain the spent acetone and residual materials remaining from the vaporization treatment accorded the batch as the volatile solvent component thereof is boiled off or vaporized. Chamber 17 serves to receive and contain a liquid heat transfer medium which is used in transferring heat to the spent acetone in chamber 16. The medium in chamber 17 is heated by an electrical heating element 94 and the interior wall serves to transmit the heat from the heated medium to the spent acetone in chamber 16.

The condenser unit 12 serves to condense the flammable acetone vapors which are formed in the evaporator unit 11 so as to thereby recover the solvent component as fresh solvent. It includes a jacketed tube-type heat exchanger 20 which is arranged to receive the acetone vapors from the evaporating unit 11. The exchanger 20 is connected to a pump 21 which is submerged in a supply of cooling water which is contained in a reservoir 19 that is provided by a bottom section of the housing 13. Pump 21 serves to pump the cooling water from the supply in the reservoir and through the heat exchanger 20 during the operation of the device 10.

Housing 13 includes a lower or bottom section 23 that provides the reservoir 19 for receiving and containing the cooling water supply, an upper section 24 and a horizontally arranged panel section 25 that divides the interior 22 of the housing into an upper compartment 26 in which the evaporator unit 11 is housed and a lower compartment 27 in which the condensing unit 12 is housed. The panel section 25 has a depending preformed portion 28 which serves to strengthen the panel which simultaneously provides a mounting place for suspending the heat exchanger 20 in the lower compartment 27.

The housing sections 23, 24 and 25 are molded sections which are made from fiberglass reinforced resinous materials that provide a strong lightweight shell or housing for protecting the unit from environmental conditions while nevertheless facilitating easy movement of the ground supported device.

The bottom section 23 of the housing has a bottom wall 30, front and rear side walls 31 and 32, and opposite side walls 33 and 34 which are formed integral in the molding process. The section 23 has a generally rectangular opening 35 at its upper end 36 and is here provided with a laterally extending flange 37 which surrounds the opening 35 and provides a support for the other housing sections 24 and 25. The section 23 is provided with suitable vents 29 so as to provide adequate circulation of air in the lower compartment 27 and thus avoid an accumulation of explosive solvent vapors.

The panel section 25 of the housing is generally rectangular in shape and, in the assembled housing 13, is arranged in the opening 35 of the lower section. Here the panel section 25 rests with its lateral edge portions 39 on the flange 37 of the lower section 23.

The upper section 24 of the housing 11 has an inclined top wall 41, front and rear side walls 42 and 43, and opposite side walls 44 and 45. At its lower end 46, the section 24 is provided with a horizontal flange portion 47 that extends laterally of the side walls of the section 24 and overlies the flange 37 of the bottom section 23. Here the flange portion rests on the marginal or edge portion 39 of the panel section 25. The flange portion 47 is provided with a skirt 48 that hangs downwardly from the flange 47 and in an arrangement that is offset from the side walls of the lower section 23. As seen in FIG. 5, the housing sections are secured together by spaced fasteners 49 which extend through the flanges 37 and 47 and through the intervening marginal portions 39 of panel section 25.

The tank 15 of the evaporator unit 11 is fabricated from aluminum structural components and has a bottom wall 51, front and rear side walls 52 and 53, and opposite side walls 54 and 55. The upper end 56 of the tank 15 has a rectangular opening 57 that is closed by an inclined cover plate 58 which forms the top wall of the tank. The plate 58 is fastened to the tank 15 by fasteners 59 that extend through the plate 58 and through laterally extending flanges 60 at the upper ends of the tank side walls. Here a gasket or seal 50 is clamped between the flanges and top plate by means of the fasteners 59.

Figure 2:
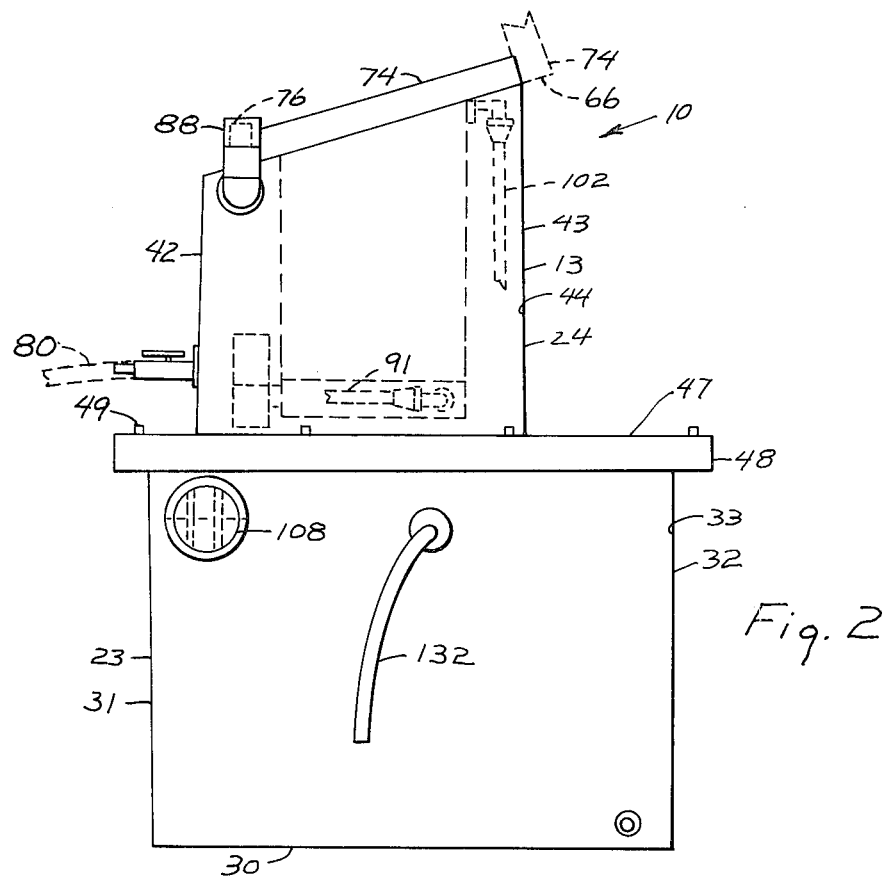
FIG. 2 is a side elevational view of the apparatus seen in FIG. 1 with certain hidden structure being shown in broken lines.
Figure 3:
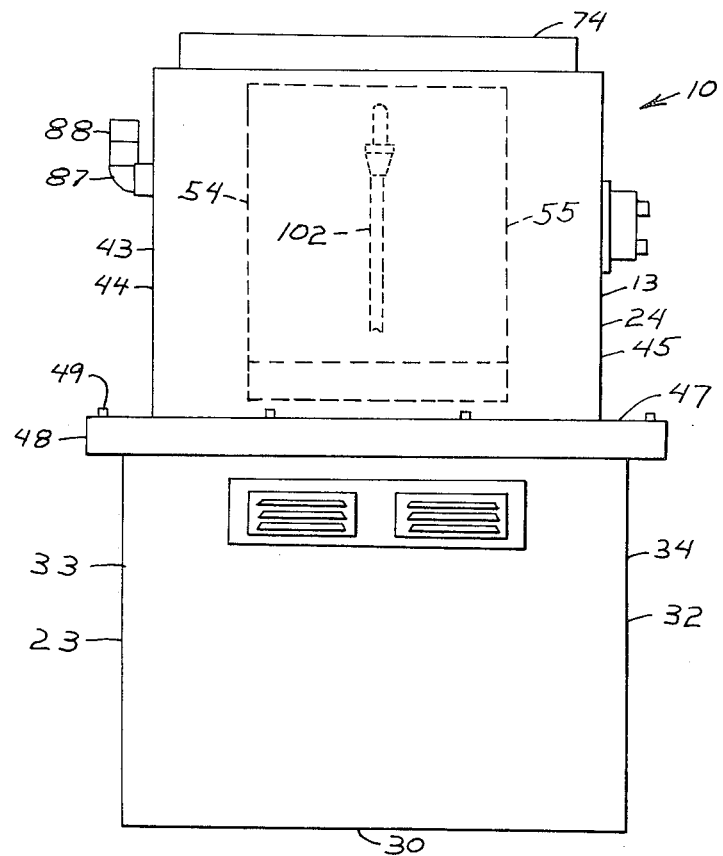
FIG. 3 is a rear elevational view of the apparatus seen in FIG. 1 with certain hidden structure being shown in broken lines.
Figure 4:
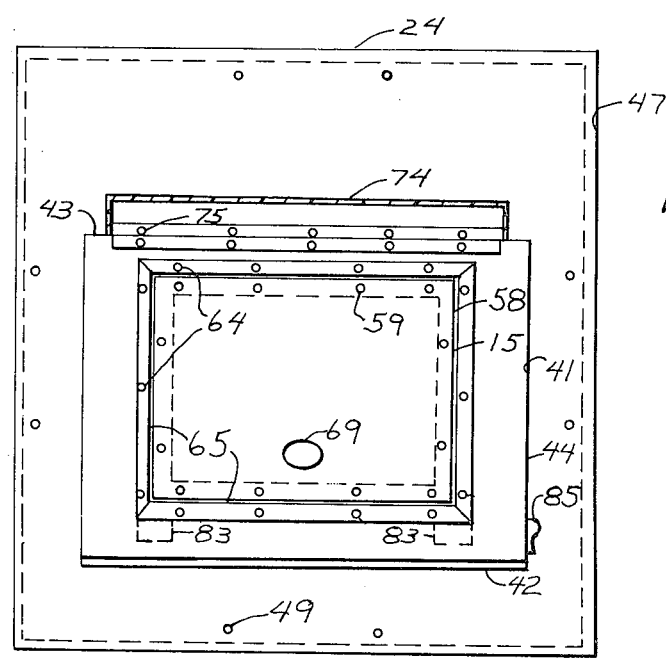
FIG. 4 is a top plan view of the apparatus seen in FIG. 1, certain parts being broken away to expose other parts.

The top wall 41 of the housing section 24 has a rectangular cutout or opening 62 and the tank 15 is suspended from the top wall 41 of the upper housing section 24 in a manner such that the rectangular plate 58 is located in the rectangular opening 62. The flanges 60 at the upper ends of the tank side walls project beneath the top wall edge portions 63 at the cutout 62 and here the tank 15 is fastened to the top wall 41 by spaced fasteners 64 that project through metal strips 65 which overlie the wall edge portions 63 and through the underlying tank flanges 60. Plate 58 has an inlet spout 68 which is equipped with a suitable cap 69 that hermetically seals the spout against the passage of vapors between the interior and exterior of chamber 16. Here, at the top of section 24, the housing is provided with a rectangular cover 74 that is hinged by a hinge 75 to the top wall 41 and pivotally moves between a closed position shown in FIG. 2 and an open position shown in broken lines and designated at 66 therein.

The interior of the tank 15 has a horizontally arranged aluminum plate 70 that is welded along its edges to the side walls of the tank 15. This plate 70 provides a wall that divides the interior 14 of the tank into the vaporizing and heating chambers 16 and 17. It also serves to transmit heat between the fluids in the respective chambers 16 and 17.

The inclined arrangement of the cover plate 58 for tank 15 provides a vapor collection zone which is generally located above the inlet spout 68 at the upper end of the chamber 16. At the upper end of the back wall 53, tank 15 has a vapor outlet 72 which connects with the zone 71 and through which the vaporized acetone passes from the chamber 16. At the bottom of the chamber, the front wall 52 of tank 15 is equipped with an outlet 77 for the passage to the exterior of the device of the residual materials that remain from the distillation process. This outlet 77 is connected to a conduit 76 which extends through the front wall 42 of the upper housing section 24 and which connects through a control valve 79 with a hose 80 for delivering the distillation residue to a suitable container. The front wall 52 of tank 15 also serves as a mounting place for a temperature sensor 81 which extends into the bottom of the chamber 16 and has a probe 82 for sensing the temperature within the chamber.

The bottom chamber 17 in the tank 15 serves to contain a suitable heat transfer fluid 84 which has a high boiling point and which is used in transferring the heat from a heating element 94 of an electrical heater 93 to the spent acetone in chamber 16. This heat transfer fluid expands when it is heated and to provide an expansion space and reservoir for the fluid, the evaporator unit 11 is equipped with a length of vinyl pipe 85 which is horizontally arranged at the front of the tank 15 and fixed to the undersides of a pair of end extensions 83 to the flanges 60 at the upper ends of the opposite side walls 54 and 55 of tank 15. Pipe 85 has an end cap 86 which is located adjacent to the right side wall 45 of the upper housing section 24 and which serves to close and seal off this end of the pipe. The other end of the pipe 85 extends through the left side wall 44 of housing section 24 and at the exterior of the side wall is equipped with an elbow 87 that provides a fill opening 76 for the reservoir. The upright leg of the elbow 87 is equipped with a removable cap 88 for covering the opening. The left side wall 54 of the tank 15 is equipped with a passageway 90 that through a suitable tube section 91 is connected with the expansion chamber and heat transfer fluid reservoir 89 that is formed by the pipe length 85.

The back wall 53 of tank 15 provides a place for mounting the electrical heater 93. The heating element 94 of the heater 93 is located inside the heat transfer chamber 17. The front wall of the tank on the other hand provides a place for mounting the temperature sensor 95 for the heat transfer fluid. This sensor 95 has a probe 96 that is located within the chamber 17 and which therein serves to sense the temperature of the fluid.

The heat exchanger or condenser 20 for the condensing unit 12 is of the jacketed tube type. It includes a center tube 98 which is coaxially arranged within a larger tube 99 that forms a surrounding jacket which is radially offset from the center tube 98 to provide a space around the center tube. Tubes 98 and 99 provide a water passageway for the passage of cooling water through the space between and in indirect heat exchange with the fluid passing through the center tube or vapor passageway 98. The elongated heat exchanger 20 in this instance is wound in the form of an involuted helix and is secured by means of brackets 100 to an elongated inclined spiraling underside surface 92 of the preformed portion 98 of section 24.

The condenser 20 is so connected to the boiler unit 11 and to the pump 21 as to provide a countercurrent flow of cooling water and solvent in indirect heat exchange within the condenser. In this respect, the center tube 98 of condenser 20 serves as the vapor passageway of the heat exchanger and it has a vapor inlet 103 at one end and which is connected to a tubular conduit 102 that communicates with the vapor collection zone 71 of chamber 16 of the evaporation unit so that the flammable vapors from the evaporation unit are received in the center tube 98. At its other end, the center tube 98 has a condensate discharge outlet 114 which is coupled to another tubular conduit 105 that communicates with the exterior of the housing 13 through the left side wall 33 of the lower housing section 23 so that the fresh acetone recovered as condensate is thereby delivered to the exterior of the housing. The arrangement of the condenser 20 is such that the condensate flows by gravity to the condensate outlet 114 and also to the exterior of the housing through conduit 105.

As previously indicated, the lower section 23 of the housing 13 forms a reservoir for water used in cooling the vapors derived from the evaporation unit 11. The reservoir 19 has an overflow outlet 107 in side wall 34 and a manipulatable side wall fill spout 108 through which the reservoir 19 can be filled by means of a garden-type waterhose or the like. The pump 21 of the condensing unit 12 is suspended by a chain 109 from the formed portion of section 24 and is submerged in and located at the bottom of the reservoir 19. The inlet 110 of pump 21 communicates with the water in the reservoir and the pump outlet 111 is connected by a flexible hose 112 to the jacket inlet 113 of the heat exchanger 20. This inlet 113 forms the water inlet for the water passageway and is located at the condensate outlet end of the condenser 20. The water or jacket outlet 114 for the water passageway is located at the vapor inlet end of the condenser 20 so that the cooling water and condensate flow in a countercurrent indirect heat exchange relation as the water is pumped through the heat exchanger jacket. At the jacket outlet 114, the outlet is connected to a depending tube 115 which through an elbow 116 discharges and passes the cooling water back into the reservoir for subsequent recycling through the heat exchanger.

The electrical circuit 120 for controlling the distillation device 10 includes the pump 21 and heater 93 as well as a control switch 121 and a pair of switch components 122 and 123 of the respective temperature sensors 81 and 95. The pump 21 and heater 93 are connected in series in line 125 and to one side of an AC electrical power source 124. The control switch 121, and the sensor switches 122 and 123 are connected in series in line 126 and with heater 93 and the other side of power source 124. Switch 121 is manually manipulatable between closed and open positions and has a time delay mechanism (not shown) which automatically responds when the control circuit is otherwise de-energized to establish the open switch position. Each of the sensor switch components 122 and 123 is normally closed and is automatically opened when a predetermined elevated temperature is sensed by the sensor thereof. As such, when switch 121 is closed, the pump and heater are normally energized. On the other hand, if the temperature sensed by either sensor probe 82 or 96 is at or exceeds the predetermined temperature at which the sensor is set, the switch responds to the sensed temperature and opens the circuit.

Before initiating operation of the device 10, cap 88 is removed and the fluid heat transfer medium 130 is poured into the reservoir 89 until chamber 17 has been filled and an overflow is evident in the reservoir 89 while nevertheless leaving adequate room for the heat transfer medium to expand into the reservoir during use. Prior to initiating operation of the device, water is also admitted to the cooling water reservoir 19 as through fill spout 108 until such time as the reservoir is full and overflowing through the water outlet 107.

To purify a batch of the spent acetone 131, cover 66 is opened and the cap 69 on fill spout 68 is removed. Thereafter, the spent acetone 131 is preferably poured into the chamber 16 through fill spout 68 until such time as the chamber 16 is full of the spent acetone and a small zone 71 exists for the vapors to collect in the chamber area above the fill spout 68. Thereafter the cap 69 is screwed onto the fill spout 68 to hermetically seal the chamber 16.

With the evaporation chamber 16 charged with a batch of spent acetone 131, the distillation device is started by closing switch 121. This energizes pump 21 and starts to circulate the cooling water between the reservoir 19 and condenser 20. It also energizes the heater 94 through the control switch 121 and normally closed sensor switches 122 and 123. As the temperature of the fluid heat exchange medium 130 rises, heat is transferred through the inner wall 70 to the spent acetone 131 in chamber 16. When the spent acetone reaches its boiling temperature in chamber 16, the solvent vapors pass into the vaporization zone 71 and thence through conduit 102 to the vapor inlet 103 of the heat exchanger 20. These vapors are condensed in the heat exchanger 20 and the condensate flows by gravity through passageway 98 to the condensate outlet 104 and thence through conduit 105. At the outside of the device, conduit 105 is provided with a flexible hose 132 for delivering the condensate and purified acetone to a suitable container (not shown).

As the batch distillation process is carried out, the temperature in the evaporator chamber remains relatively constant and substantially at the atmospheric boiling point of the solvent. As the quantity of acetone diminishes during the distillation procedure, the soluble resinous materials come out of the solution and collect at the bottom of the chamber 16. As this happens, the boiling temperature of the spent solvent remains relatively constant. However, when most of the solvent has been vaporized, the temperature of the remaining liquid in chamber 16 suddenly rises above the atmospheric boiling point of the solvent. Sensor 81 is set to respond to a sensed temperature in chamber 16 which is slightly above (2°-5° C.) the boiling point of the purified solvent and when this happens the sensor switch 122 automatically opens and breaks the control circuit 120. This, of course, de-energizes the heater and pump and through the time delayed mechanism moves switch 121 to the opened condition.

At this point the resinous materials remaining from the distillation may be withdrawn from chamber 16 by manipulating valve 79 to drain the sludge from the chamber 16 through hose 80 and into a suitable receptacle (not shown).

The temperature sensor 95 in the heat transfer medium chamber 17 is set to respond at a temperature which is substantially above that at which sensor 81 responds so as to enable the fluid medium to attain a suitably high enough temperature to provide an adequate driving force for transmitting the heat to the evaporating chamber.

While a certain preferred embodiment of this invention has been shown and described by way of illustration, many modifications will occur to those skilled in the art and it is, therefore, desired that it be understood that it is intended herein to cover all such modifications that fall within the true spirit and scope of this invention.

What is claimed as new and what it is desired to secure by Letters Patent of the United States is:

1. A portable outdoor distillation apparatus for use in recovering the highly volatile and flammable solvent component of a batch of spent liquid solvent that includes said solvent component, said apparatus comprising: a ground supported housing that has a first compartment with a reservoir for receiving and containing a supply of cooling water and a second compartment located above said first compartment, an evaporator unit located in said second compartment for treating said batch at substantially atmospheric pressure conditions to vaporize and separate the solvent component as flammable solvent vapors from the residual material remaining from the vaporization treatment, and a condensing unit located in said first compartment for condensing said flammable solvent vapors at substantially atmospheric pressure conditions to thereby recover said solvent component as fresh solvent; said evaporator unit comprising a first chamber for receiving said batch and containing said residual material during the vaporization of said solvent component therein, a second chamber for receiving and containing a liquid heat exchange medium, means in the second chamber for heating the liquid heat exchange medium contained therein during the vaporization of said solvent component, and a wall that separates and serves to transmit heat between the heat exchange medium and the batch of spent liquid solvent contained in the respective chambers; said condensing unit including a heat exchanger with a water passageway and an elongated vapor passageway that has a vapor inlet which is connected to receive said flammable solvent vapors from said first chamber and a condensate discharge outlet, and means connected to the heat exchanger for pumping cooling water from the supply contained in the reservoir through said heat exchanger and in indirect heat exchange with the flammable solvent vapors received in said vapor passageway of said heat exchanger, said elongated vapor passageway being inclined between said condensate outlet and said vapor inlet to therein provide a gravity flow of the condensate to said condensate outlet, and said water passageway having a water inlet that is connected to receive the cooling water pumped by the pumping means and a water outlet that is arranged to pass the cooling water received in the water passageway back into said reservoir.

2. A portable outdoor distillation apparatus for use in recovering the highly volatile and flammable solvent component of a batch of spent liquid solvent that includes said solvent component, said apparatus comprising: an evaporator unit for treating said batch at substantially atmospheric pressure conditions to vaporize and separate the solvent component as flammable solvent vapors from the residual material remaining from the vaporization treatment, a condensing unit for condensing said flammable solvent vapors at substantially atmospheric pressure conditions to thereby recover said solvent component as fresh solvent, and a ground supported housing for such units; said evaporator unit comprising a fabricated aluminum container having a horizontally arranged internal wall that divides the interior of the container into an upper chamber for receiving said batch and containing said residual material during the vaporization of said solvent component therein and a lower chamber that is located beneath said upper chamber for receiving and containing a liquid heat exchange medium, and electrical means located in the lower chamber for heating the liquid heat exchange medium contained therein during the vaporization of said solvent component; said housing comprising a lower section with an upper end opening and a reservoir therebelow for receiving and containing a supply of cooling water, a panel section secured to the lower section and located in the upper end opening thereof, and an upper section that defines a compartment over the panel section in which said evaporator unit is housed; said condensing unit comprising an elongated heat exchanger which is suspended from said panel section and located in said lower section and which has opposite ends, said heat exchanger having a water passageway and a vapor passageway with a solvent vapor inlet which is located at one of said ends and arranged to receive said flammable solvent vapors from said upper chamber and a condensate discharge outlet which is located at the other of said ends, and a pump for pumping cooling water from the supply contained in the reservoir through said heat exchanger and in indirect heat exchange with the flammable solvent vapors received in said vapor passageway of said heat exchanger, said upper chamber having a vapor zone for receiving and containing said flammable solvent vapors during the vaporization of said solvent component therein, said solvent vapor inlet being connected to said vapor zone, said heat exchanger being arranged to provide a gravity flow to the condensate outlet of the flammable solvent vapors condensed in said vapor passageway, and said water passageway having a water inlet that is connected to receive the cooling water pumped by the pumping means and a water outlet that is arranged to pass the cooling water received in the water passageway back into said reservoir.

3. A portable distillation apparatus for use in recovering the highly volatile and flammable solvent component of a batch of spent liquid solvent that includes said solvent component in accord with claim 2 wherein said apparatus comprises controllable means for energizing a circuit that includes said electrical heating means, temperature sensing means which is located in said upper chamber and responsive at a predetermined temperature in said upper chamber to open said circuit, and another temperature sensing means which is located in said lower chamber and responsive at a predetermined temperature in said lower chamber to open said circuit.

4. A portable outdoor distillation apparatus for use in recovering the acetone component of a batch of spent acetone solvent that includes said acetone component, said apparatus comprising a unit for treating said batch at substantially atmospheric pressure conditions to vaporize and separate the acetone component as acetone vapors from the residual material remaining from the vaporization treatment, a unit for condensing said acetone vapors at substantially atmospheric pressure conditions to thereby recover said acetone component as fresh solvent, and a ground supported housing for the units having a bottom section with a reservoir for containing a supply of cooling water, and a panel section which is secured to the bottom section and overlies the reservoir, said vaporizing unit comprising a fabricated aluminum container having a first chamber for receiving said batch and containing said residual material during the vaporization of said acetone component therein, a second chamber for receiving and containing a liquid heat exchange medium, and a horizontal interior wall that separates and serves to transmit heat between said liquid heat exchange medium and the batch of spent acetone solvent contained in the respective chambers, said ground supported housing having an upper section which is secured to the bottom and panel sections of the housing and forms a compartment over the panel section in which said vaporizing unit is located, said vaporizing unit comprising an electrical heating element which is located in said second chamber and energizable to heat the liquid heat exchange medium contained therein during the vaporization of said solvent component, said first chamber having a vapor zone for receiving the acetone vapors during the vaporization of said acetone component therein, said container having inlet forming means communicating with the vapor zone of the first chamber for admitting said spent acetone solvent to said first chamber, removable closure means closing the inlet of said inlet forming means, and outlet forming means communicating with said first chamber adjacent to said interior wall for draining said residual material remaining from the vaporization treatment of said batch therein, said upper section having a top wall and said container being secured to and suspended from said top wall, said condensing unit comprising a heat exchanger which is suspended from said panel section and has an elongated tubular means with opposite ends and a water jacket surrounding said tubular means between said opposite ends, said apparatus comprising conduit means communicating with said vapor zone and arranged to deliver the acetone vapors received therein to one of the opposite ends of said tubular means, said condensing unit further comprising pumping means connected to the heat exchanger and located in said reservoir for pumping cooling water from the supply contained in said reservoir through said water jacket and in indirect countercurrent heat exchange with the passage of condensed acetone vapors through the tubular means, and said heat exchanger being arranged to provide a gravity flow of the condensed acetone vapors from said one to the other of said opposite ends of said tubular means and said water jacket having a water inlet that is connected to receive the cooling water pumped by a pumping means and a water outlet that is arranged to pass the cooling water received in the water jacket back into said reservoir.

5. A portable outdoor distillation apparatus for use in recovering the acetone component of a batch of spent acetone solvent that includes said acetone component in accord with claim 4 wherein said panel section has a preformed portion with an inclined underside surface, wherein said heat exchanger is secured to said panel section at said underside surface and follows the contour of the inclined underside surface of the preformed portion between the opposite ends of said tubular means.

6. A portable outdoor distillation apparatus for use in recovering the acetone component of a batch of spent acetone solvent that includes said acetone component in accord with claim 4 wherein said apparatus comprises controllable means for energizing a circuit that includes said electrical heating element, temperature sensing means which is located in said first chamber and responsive at a predetermined temperature in said first chamber to open said circuit, and temperature sensing means which is located in said second chamber and responsive at a predetermined temperature in said second chamber to open said circuit.

7. A portable outdoor distillation apparatus for use in recovering the acetone component of a batch of spent acetone solvent that includes said acetone component in accord with claim 4 wherein the sections of said housing are molded from fiberglass reinforced resinous materials.

* * * * *